United States Patent
Dhanoa et al.

(10) Patent No.: US 7,460,493 B1
(45) Date of Patent: Dec. 2, 2008

(54) VIDEO CONFERENCING SYSTEM WITH DYNAMIC CALL MANAGEMENT AND SET-UP

(75) Inventors: Shingara S. Dhanoa, Overland Park, KS (US); Ezzat S. Atieh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 998 days.

(21) Appl. No.: 10/896,402

(22) Filed: Jul. 22, 2004

(51) Int. Cl.
*H04L 12/16* (2006.01)

(52) U.S. Cl. ............... 370/260; 348/14.08; 379/202.01; 709/204

(58) Field of Classification Search ............ 379/202.01; 370/260; 348/14.08; 709/204
See application file for complete search history.

(56) References Cited

U.S. PATENT DOCUMENTS

| | | | |
|---|---|---|---|
| 5,440,563 A | 8/1995 | Isidoro et al. | |
| 5,812,652 A | 9/1998 | Jodoin et al. | |
| 5,995,608 A | 11/1999 | Detampel, Jr. et al. | |
| 6,236,644 B1 | 5/2001 | Shuman et al. | |
| 6,282,278 B1 * | 8/2001 | Doganata et al. | 379/202.01 |
| 6,714,635 B1 * | 3/2004 | Adams et al. | 379/204.01 |
| 6,920,212 B2 * | 7/2005 | Stern et al. | 379/202.01 |
| 7,119,828 B1 * | 10/2006 | Kizhnerman et al. | 348/14.08 |
| 2003/0058806 A1 | 3/2003 | Meyerson et al. | |

OTHER PUBLICATIONS

Cisco Systems, Inc., *Cisco SIP Proxy Server Data Sheet*, 2004, pp. 1-5.
Cisco Systems, Inc., *Cisco IP Interactive Voice Response*, 1992-2003, pp. 1-4.
www.telecommagazine.com, *Session Border Control Making Dreams Realty*, 2003, pp. S1-S9.
Polycom, *Polycom Unified Conferencing Bridge Video and Video Conferencing on One MGC Platform*, 2002, pp. 1-8.

* cited by examiner

*Primary Examiner*—Gerald Gauthier

(57) ABSTRACT

Telephony conferences are established within a packet network. Utilization of a plurality of conference bridge resources within the packet network is monitored. A database of user profiles is maintained associating authorized users of the conference bridge resources with respective PIN codes. A host user links to a call manager to initiate a request for a conference session. The host user is authenticated according to a respective one of the user profiles to determine an authenticated PIN code for identifying the conference session. A portion of the conference bridge resources are allocated in response to the authentication. The authenticated PIN code is forwarded to the conference bridge resources. The host user links to the allocated conference bridge resources. A guest user links to the call manager to initiate a request to participate in the conference session. The guest user identifies the authenticated PIN code. The guest user links to the allocated conference bridge resources. The host user and the guest user are bridged via the allocated bridge resources in response to the authenticated PIN code.

25 Claims, 4 Drawing Sheets

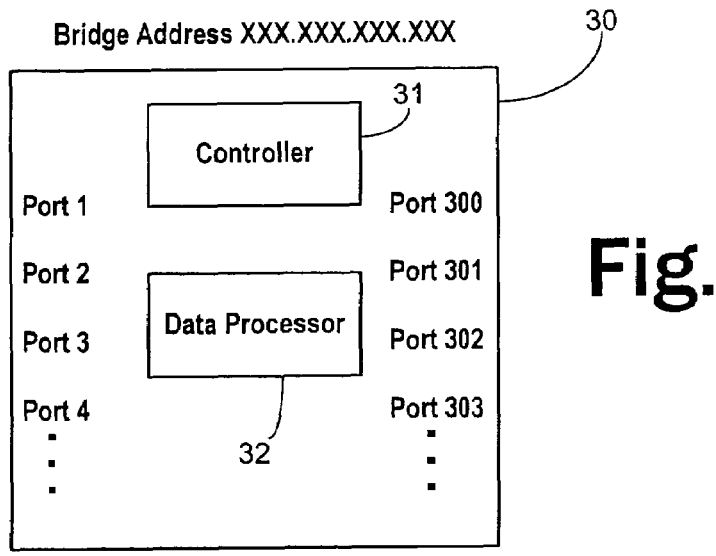

Status Database 27

| 1 | Bridge Address #1 | Port Capacity | Ports Allocated |
| 2 | Bridge Address #2 | Port Capacity | Ports Allocated |
| 3 | Bridge Address #3 | Port Capacity | Ports Allocated |
| 4 | Bridge Address #4 | Port Capacity | Ports Allocated |
| 5 | Bridge Address #5 | Port Capacity | Ports Allocated |

User Profile Database

| 1 | User ID #1 | Password #1 | PIN Code #1 | Subscribed Options #1 |
| 2 | User ID #2 | Password #2 | PIN Code #2 | Subscribed Options #2 |
| 3 | User ID #3 | Password #3 | PIN Code #3 | Subscribed Options #3 |
| 4 | User ID #4 | Password #4 | PIN Code #4 | Subscribed Options #4 |
| 5 | User ID #5 | Password #5 | PIN Code #5 | Subscribed Options #5 |
| 6 | User ID #6 | Password #6 | PIN Code #6 | Subscribed Options #6 |

Fig. 4

VIDEO CONFERENCING SYSTEM WITH DYNAMIC CALL MANAGEMENT AND SET-UP

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to telephony conferencing in a packet-switched network, and, more specifically, to a video or audio conferencing service that is easy to use and that makes efficient use of bridge resources.

Teleconferencing has become a useful tool for allowing three or more physically separated parties to participate in the same telephony call. Such calls are completed by connecting each party to a teleconferencing bridge which has a number of ports for selectably interconnecting participants of a particular conference call. Depending upon the capabilities of the bridge and the network, conferences may be audio only or can be video and audio conferences. With the proliferation of packet-switched networks such as the Internet, audio and video conferencing has become more accessible to users in general. Specialized software and hardware and the introduction of standard protocols are making teleconferencing easier to implement across a network.

In order to provide a teleconferencing service in a cost-effective matter, a service provider must insure that adequate bridge resources are available while avoiding underutilization that results from deploying too many bridge resources. Typically, teleconferences have been scheduled in advance in order to allow the service provider to manage their bridge resources according to the times of conferences and number of parties to be included in a conference. Thus, the service provider can balance the resource load across its existing resources. Advance scheduling has also been required for purposes of arranging for payment details. Once a conference has been scheduled, unique telephone numbers for participants to call and/or unique conference identification numbers or passcodes have had to be distributed to the conference participants in advance. Consequently, teleconferencing systems have been somewhat inconvenient to use and have not supported user's desires to initiate conferences upon a moment's notice.

SUMMARY OF THE INVENTION

The present invention provides a conference service architecture and methods that achieve ease of usage and that maximize efficiency of resources.

In one aspect of the invention, a method of managing conferences via a packet network is provided. Utilization of a plurality of conference bridge resources within the packet network is monitored. A database of user profiles is maintained associating authorized users of the conference bridge resources with respective PIN codes. A host user links to a call manager to initiate a request for a conference session. The host user is authenticated according to a respective one of the user profiles to determine an authenticated PIN code for identifying the conference session. A portion of the conference bridge resources are allocated in response to the authentication. The authenticated PIN code is forwarded to the conference bridge resources. The host user links to the allocated conference bridge resources. A guest user links to the call manager to initiate a request to participate in the conference session. The guest user identifies the authenticated PIN code. The guest user links to the allocated conference bridge resources. The host user and the guest user are bridged via the allocated bridge resources in response to the authenticated PIN code.

BRIEF DESCRIPTION OF THE DRAWINGS

FIG. 2 is a block diagram of a conference bridge.

FIG. 3 represents a status database maintained by the bridge manager of the present invention.

FIG. 4 represents a user profile database of the present invention.

DETAILED DESCRIPTION OF PREFERRED EMBODIMENTS

Figure 1:
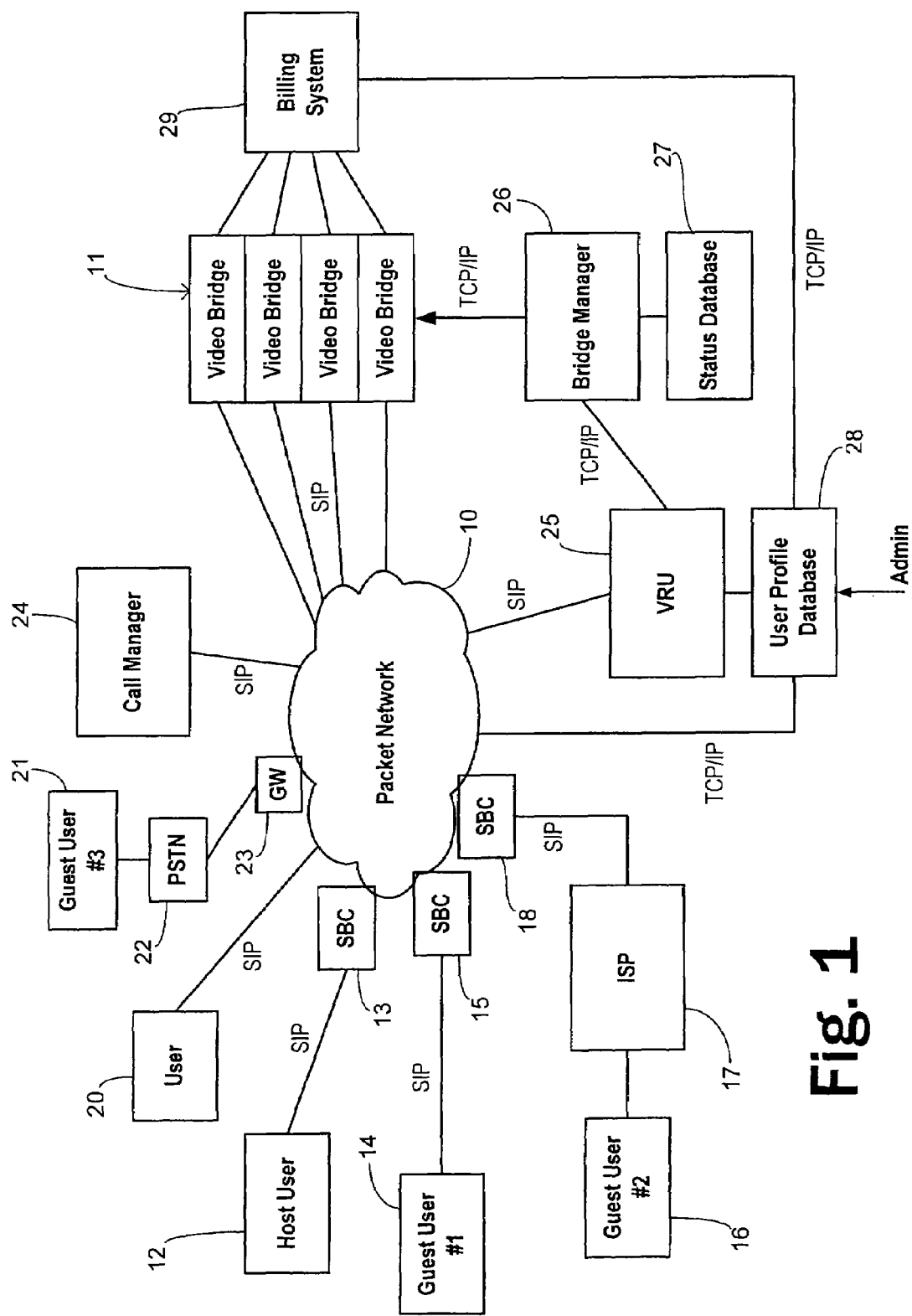
FIG. 1 is a block diagram of one preferred network architecture of the present invention.

Referring now to FIG. 1, an architecture for a teleconferencing system deployed within a packet network is shown which dynamically manages conference bridge resources without requiring advanced scheduling of conferences. A packet network 10 is connected to a plurality of conference bridge resources 11 shown as video conference bridges in the preferred embodiment. The conferencing service of the present invention allows a plurality of users such as a host user 12 to utilize bridge resources 11 on demand. Host user 12 is coupled to packet network 10 by a session border controller (SBC) 13. A first guest user 14 is coupled to packet network 10 by an SBC 15. A second guest user 16 is connected to an Internet service provider (ISP) 17 which is connected to packet network 10 via an SBC 18. User's 12 and 14 may be connected within any arbitrary network.

A host user or guest user can also be directly coupled to packet network 10 as is shown by a user 20. Packet network 10 may be a managed network on behalf of a particular enterprise or may be a public network. A guest user 21 may be connected to a public switched telephone network (PSTN) 22 which is coupled to packet network 10 via a gateway 23. As used herein, a host user is a user having been granted access for initiating conference sessions and a guest user is any user capable of joining a previously initiated conference session.

The teleconferencing system of the present invention further includes a call manager 24 and a voice response unit (VRU) 25 coupled to packet network 10. A bridge manager 26 is coupled to VRU 25 and to conference bridge resources 11. Bridge manager 26 maintains a status database 27 for purposes of allocating bridge resources 11 to conference sessions being established within the conferencing service. A user profile database 28 is coupled to VRU 25 to identify authorized users of the conference service. A billing system 29 is coupled to conference bridge resources 11 and to user profile database 28 in order to provide for accounting and billing functions in connection with usage of the conferencing service by host users.

Call manager 24 may be comprised of a proxy server (such as a Cisco SIP proxy server from Cisco Systems, Inc.) or a softswitch (such as the Lucent Softswitch from Lucent Technologies). Call manager 24 provides a routing engine to allow users to access the various components of the conferencing system. A predetermined service ID is established within packet network 10 for routing all user requests for the conferencing service to call manager 24. Users may be then forwarded by call manager 24 to VRU 25 which may be comprised of a server running the IP Interactive Voice Response software application from Cisco Systems, Inc., for example. When contacted by a host user, VRU 25 authenticates the user in reliance on user profile database 28. User records in user profile database 28 may be created or edited via direct access by an administrator, via a web interface (including a direct connection to packet network 10), or via VRU 25 using an appropriate menu sequence in VRU 25.

VRU 25 determines availability of conference bridge resources when handling requests via its direct connection to bridge manager 26 over a TCP/IP link. Bridge manager 26 is in continuous contact with conference bridge resources 11 in order to maintain current usage status information in status database 27.

A typical conference bridge 30 is shown in FIG. 2. Bridge 30 is identified by a corresponding bridge address and supplies a plurality of ports at that bridge address for handling respective user connections. Bridge 30 includes a controller 31 and a data processor 32 for handling signaling and data streams, respectively, as is known in the art. Control signaling is preferably handled via the SIP protocol and media transport is handled using the RTP protocol.

FIG. 3 shows a preferred structure for status database 27. A plurality of records each identify a corresponding bridge address, port capacity of the bridge, and number of ports currently allocated within that port capacity. Additional information that may be included in status database 27 may include bridge type (e.g., audio or video) and codecs supported. Status database 27 may be manually configured to contain bridge address, capacity, and bridge type and codec information or bridge manager 26 may be provided with the capability of automatically discovering conference bridge resources that are connected within the network.

User profile database 28 is shown in FIG. 4. A database record for each respective user includes a respective user ID, password, PIN code, and subscribed options. The user ID is preferably a fixed value uniquely identifying a user. The password is a secret code used to authenticate the user. The PIN code may preferably be a fixed value and in one preferred embodiment may be the same as the user ID. Alternatively, the PIN code may be a fixed value different than the user ID or may be a variable or varying code that may be system assigned, user assigned, or chosen from a plurality of values corresponding to the particular user ID, for example.

Subscribed options within user profile data base 28 may include an identification of optional service levels selected by a user (e.g., maximum number of conference participants, types of conferences such as audio and/or video, days or times of conference access, and optional protocol conversions). User profile database 28 may further include accounting information for identifying a payment mechanism used by a particular user and any payment related restrictions associated with a user.

Figure 5:
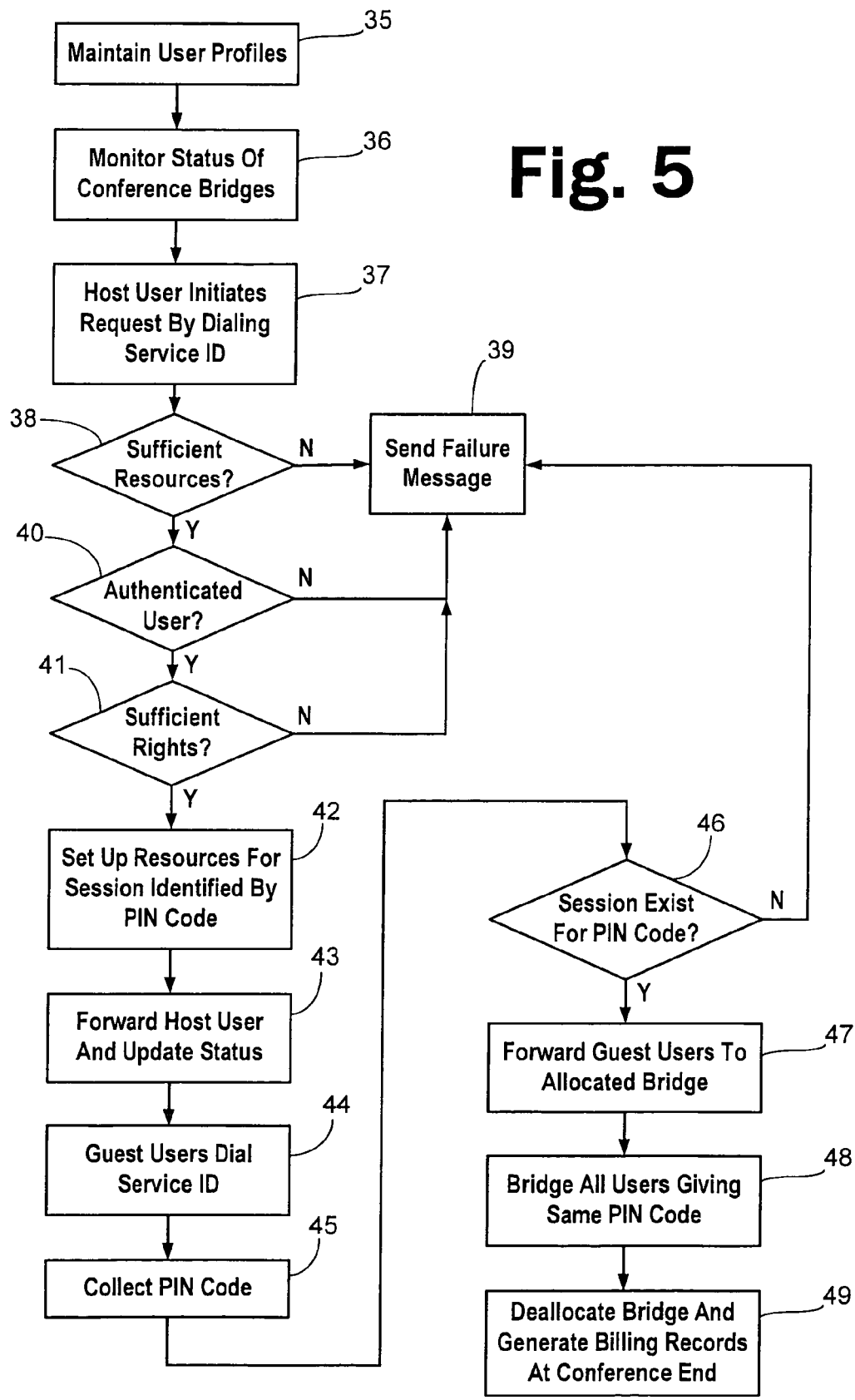
FIG. 5 is a flowchart showing one preferred method of implementing a conferencing service of the present invention.

The overall conferencing service of the present invention will be more fully described in connection with the flowchart of FIG. 5. In step 35, user profiles are maintained. User profile maintenance may be conducted by the service provider by manually configuring database entries for respective users by direct connection to the server on which the database resides. Alternatively, administration of user profiles may be conducted via remote network access over the managed, packet network via a browser interface with appropriate security measures. Either the service provider or the actual end customer may also configure user profile entries via the VRU if desired.

In step 36, the bridge manager monitors the status of the conference bridge resources on a continuous basis. In step 37, the host user for a particular conference session initiates a request for a conference by dialing or otherwise entering a service ID (e.g., entered on the keypad of the user's video phone). A check is made by the conference service in step 38 to determine whether sufficient conference bridge resources are available. If not, then a failure message is sent in step 39 and the call is disconnected.

If sufficient resources are available in step 38, then an attempt is made to authenticate the user in step 40 (e.g., by verifying a user name and password of an authorized user). If not authenticated, then the process is terminated at step 39.

Otherwise, a check is made in step 41 to determine whether the authenticated user has sufficient rights to conduct the conference session being requested. Varying service levels may include the number of participants permitted for a call, the time of day or week of a call, or the type of media (e.g., audio or video) being requested.

During authentication, the PIN code assigned to the host user is retrieved. In step 42, if sufficient rights are available for the requested call then the conference bridge resources are set up to create a conference session that will be identified by the respective PIN code. In step 43, the host user's call is forwarded to the allocated conference bridge resources and the status of the bridge resources is updated in the status database.

When additional participants wish to join the conference session that has been initiated up by the host user, each guest user dials the service ID in step 44. The conferencing service collects the PIN code of the authenticated host user (hereinafter "authenticated PIN code") from the guest user in step 45. It is especially convenient to use a permanent PIN code which can be distributed to associates of the host once and then repeatedly used for conferences between the host user and those associates. A check is made in step 46 to determine whether a conferencing session currently exists for the authenticated PIN code. If not, then a failure message is sent to the guest user in step 39. If an existing conference session is found, then guest user supplying the authenticated PIN code is forwarded to the allocated conference bridge resources in step 47. In step 48, the bridge resources bridge together all users giving the same authenticated PIN code. At the end of the conference session (e.g., when the host user disconnects), the conference bridge resources are deallocated and billing records may be generated in step 49.

Figure 6:
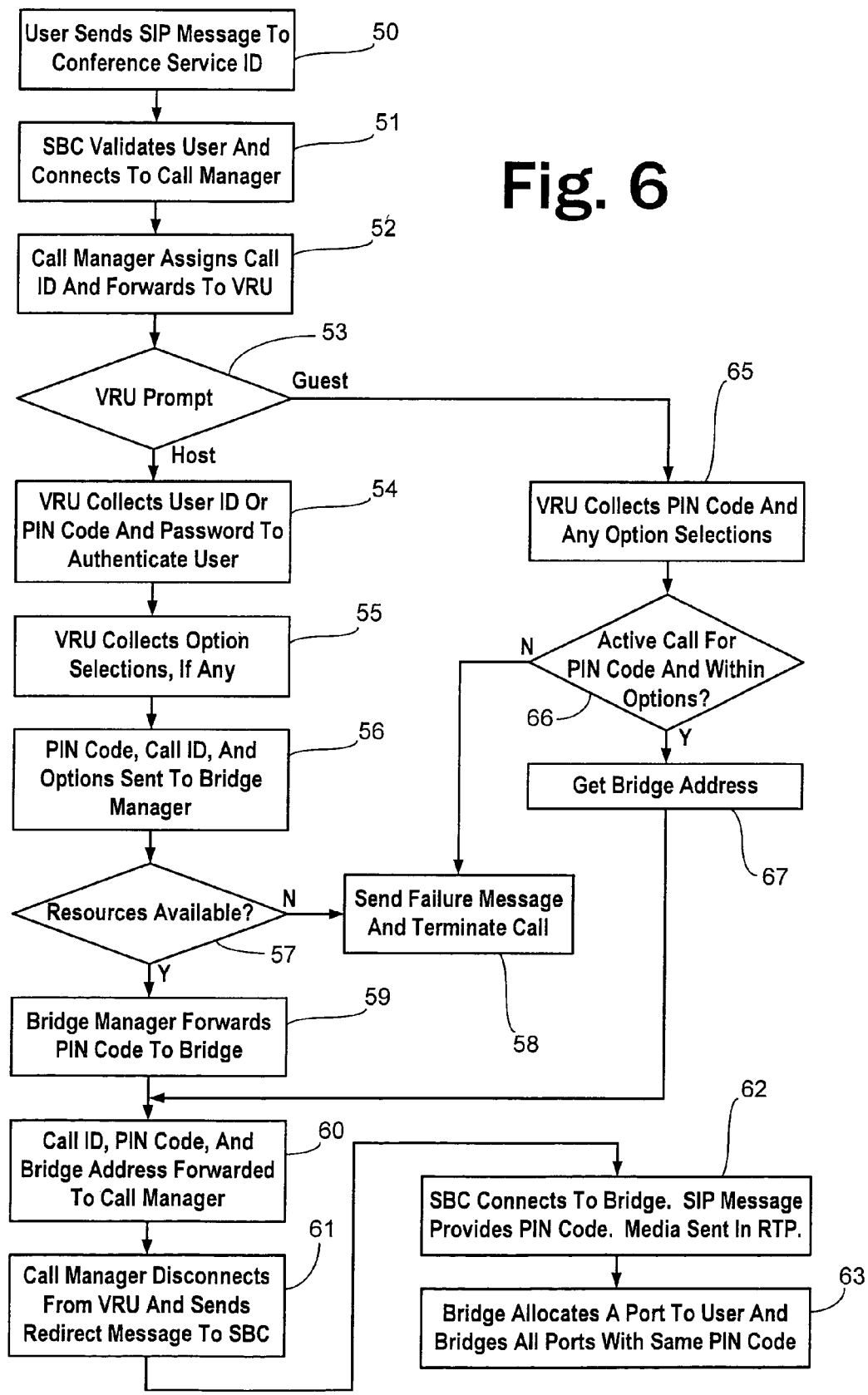
FIG. 6 is a flowchart showing a preferred messaging sequence in greater detail.

The flow of packet messages in the conferencing system architecture of FIG. 1 will be described in greater detail using the flowchart of FIG. 6. In step 50, the host user sends a session initiation protocol (SIP) message to the conference service ID which may resemble a standard telephone number E.164 address or an email address. If present, an SBC validates the user and then connects the user to the call manager in step 51. The call manager detects the incoming link from the user and responds to the SIP invite message by assigning a Call ID which is then used to identify the call of the linked user throughout the conference session. In step 52, the call manager (e.g., proxy server) sends a SIP invite message to the VRU which responds with a SIP acknowledge message having the Call ID embedded therein. The calling host user is then linked with the VRU.

Within the media stream of the SIP session opened between the calling host user and the VRU, the VRU prompts the caller to identify whether they are a host user or a guest user in step 53. If the caller is a host user, then the VRU collects a user ID or PIN code and a password from the caller to authenticate the user in step 54. In step 55, the VRU collects any option selections provided within the particular conferencing service, such as audio or video conference and any optional protocol conversions or codecs to be used. Voice prompts followed by spoken or keypad responses may be used as is known in the art.

The authenticated PIN code, Call ID, and selected options are sent to the bridge manager in step 56 via appropriate TCP/IP messaging. Based on the conference call parameters, the bridge manager checks to determine whether sufficient resources are available in step 57. If sufficient recourses are not available, then a failure message is sent and the call is terminated in step 58. If sufficient resources are available, then the bridge manager forwards the authenticated PIN code to the allocated conference bridge resources in step 59 to enable the bridge resources to bridge all incoming calls related to the particular conferencing session. In addition, the bridge address of the allocated bridge resources is provided from the bridge manager to the VRU.

If a guest user is identified in step 53, then the VRU collects the PIN code identifying the desired conference from the guest user in step 65 along with any option selections that may be available to a guest user, such as a media type. A check is made in step 66 to determine whether an active conference session exists for the identified PIN code and whether any selected options are within those authorized for the conference session. If not, then a failure message is sent to the guest user in step 58 and the call is terminated. Otherwise, the VRU gets the bridge address corresponding to the authenticated PIN code from the bridge manager in step 67.

Whether the user is the host user or the guest user, the Call ID, PIN code, and bridge address that have been determined by the VRU are forwarded to the call manager in step 60. In step 61, the call manager disconnects from the VRU and forwards the user to the identified bridge address. The forwarding may include the sending of a redirect message to an SBC, for example. In step 62, the SBC (or whatever other user connection is being employed) links to the allocated bridge resources. A SIP message in the connection setup provides the authenticated PIN code to the bridge to allow bridging of the correct users. Media within the conference session is preferably sent with the real time protocol (RTP). The bridge allocates a respective port to each connecting user and then bridges all ports identifying the same authenticated PIN code in step 63.

What is claimed is:

1. A method of managing conferences via a packet network, said method comprising the steps of:
   monitoring utilization of a plurality of conference bridge resources within said packet network;
   maintaining a database of user profiles associating authorized users of said conference bridge resources with respective PIN codes;
   a host user initiating a call to a call manager to initiate a request for a conference session, wherein said host user identifies a Service ID used by said packet network to direct said call to said call manager;
   said call manager creating a first Call ID for said call;
   authenticating said host user according to a respective one of said user profiles to determine an authenticated PIN code for identifying said conference session;
   allocating a portion of said conference bridge resources in response to said authentication;
   forwarding said authenticated PIN code to said conference bridge resources;
   forwarding said call with said first Call ID of said host user to said allocated conference bridge resources;
   a guest user initiating a call to said call manager using said Service ID to initiate a request to participate in said conference session;
   said guest user identifying said authenticated PIN code;
   forwarding said call initiated by said guest user to said allocated conference bridge resources; and
   bridging said host user and said guest user via said allocated bridge resources in response to said authenticated PIN code.

2. The method of claim 1 further comprising the step of:
   in response to said host user calling said call manager, forwarding said call with said first Call ID to a voice response unit for performing said authenticating step.

3. The method of claim 2 further comprising the steps of:
   said call manager creating a second Call ID for said guest user's call;
   in response to said guest user calling said call manager, forwarding said call with said second Call ID to said voice response unit for performing said identifying step.

4. The method of claim 1 wherein a bridge manager maintains a status database for monitoring said utilization of said plurality of conference bridge resources, wherein said bridge manager recurrently receives status messages from said plurality of conference bridge resources, and wherein said bridge manager allocates said allocated conference bridge resources in response to said status database.

5. The method of claim 4 further comprising the step of:
   said conference bridge resources sending a termination message to said bridge manager upon termination of said conference session to signal availability of said previously allocated conference bridge resources.

6. The method of claim 1 wherein said host user is connected to said packet network via a session border controller, wherein said session border controller links said host user to said call manager in response to said Service ID, and wherein said host user is linked to said allocated bridge resources by sending a redirect message containing a bridge address of said allocated conference bridge resources to said session border controller.

7. The method of claim 1 wherein said guest user is connected to said packet network via a session border controller, wherein said session border controller links said guest user to said call manager in response to said Service ID, and wherein said guest user is linked to said allocated bridge resources by sending a redirect message containing a bridge address of said allocated conference bridge resources to said session border controller.

8. The method of claim 1 wherein said user profiles each further includes a respective user ID and password utilized in said authenticating step.

9. The method of claim 8 wherein said user profiles each further includes subscribed option data for providing conditional access to predetermined portions of said conference bridge resources.

10. The method of claim 1 wherein said conference session is comprised of a video conference session.

11. Apparatus within a packet network for carrying out multiparty real-time communication conferences, comprising:

a plurality of conference bridge resources having a plurality of respective bridge addresses, wherein each bridge address has a corresponding load capacity;

a call manager receiving host user requests for initiating a conference session and guest user requests for joining an initiated conference session;

a user profile database for associating authorized users of said conference bridges with respective PIN codes;

a voice response unit coupled to said call manager and to said user profile database, said voice response unit authenticating said host user in accordance with said user profile database to determine an authenticated PIN code for identifying a conference session, and said voice response unit collecting an authenticated PIN code from said guest user; and a bridge manager for monitoring utilization of said plurality of conference bridge resources and for allocating a portion of said conference bridge resources to said conference session in response to said host user request.

12. The apparatus of claim 11 further comprising a session border controller for coupling said host user to said packet network, wherein said session border controller links said host user to said call manager in response to a predetermined service identifier, and wherein said host user is linked to said allocated bridge resources by sending a redirect message containing a bridge address of said allocated conference bridge resources to said session border controller.

13. The apparatus of claim 11 wherein said bridge manager maintains a status database for monitoring said utilization of said plurality of conference bridge resources, wherein said bridge manager recurrently receives status messages from said plurality of conference bridge resources, and wherein said bridge manager allocates said allocated conference bridge resources in response to said status database.

14. The apparatus of claim 11 wherein said call manager is comprised of a proxy server.

15. The apparatus of claim 11 wherein said user profile database is comprised of user profiles including respective user ID's, passwords, and PIN codes.

16. The apparatus of claim 15 wherein said user profiles further include subscribed option data.

17. The apparatus of claim 11 wherein said conference bridge resources are comprised of video bridges.

18. The apparatus of claim 11 wherein said call manager communicates with said host user, said guest user, and said voice response unit via SIP-based messages.

19. The apparatus of claim 11 wherein said conference bridge resources communicate with said host user and said guest user via SIP-based messages and wherein said conference bridge resources communicate with said bridge manager via TCP/IP-based messages.

20. The apparatus of claim 11 wherein said voice response unit communicates with said bridge manager via TCP/IP-based messages.

21. A video conference service within a packet network comprising:

a network-based user profile database configurable to provide respective user profiles of a plurality of authorized users, said user profiles each including a respective password and PIN code;

a plurality of allocable video conference bridge resources; and a voice response interface accessible by a host user to initiate a video conference session in response to authentication of said host user as one of said authorized users thereby identifying an authenticated PIN code for said video conference session, and accessible by a guest user to join said video conference session in response to providing said authenticated PIN code to said voice response interface.

22. The video conference service of claim 21 further comprising:

a billing system coupled to said video conference bridge resources for monitoring usage by said host user and initiating payment from said host user for said usage.

23. The video conference service of claim 21 wherein a respective user profile is configured by an administrator having direct access to said user profile database.

24. The video conference service of claim 21 wherein a respective user profile is configured via a browser interface accessed over said packet network.

25. The video conference service of claim 21 wherein a respective user profile is configured via said voice response interface.

* * * * *